(12) United States Patent
Ou

(10) Patent No.: US 6,317,497 B1
(45) Date of Patent: Nov. 13, 2001

(54) TOGGLE JOINT COMBINATION FOR EXTENDING A RECEPTACLE OF AUTOMOBILE CIGARETTE LIGHTER AND APPLICATION THEREOF

(76) Inventor: Jack Ou, 3F., No. 12, Lane 47, Fu-Kang Street, Nan-Kang District, Taipei (TW)

( * ) Notice: Subject to any disclaimer, the term of this patent is extended or adjusted under 35 U.S.C. 154(b) by 0 days.

(21) Appl. No.: 09/310,529

(22) Filed: May 12, 1999

(51) Int. Cl.[7] .............................. H04M 1/12; H04M 1/00
(52) U.S. Cl. ..................... 379/454; 379/446; 379/455; 403/91; 403/92; 403/158; 439/165
(58) Field of Search ................. 403/84, 91, 92, 403/93, 94, 110, 87; 379/446; 455/569

(56) References Cited

U.S. PATENT DOCUMENTS

| | | | | |
|---|---|---|---|---|
| D. 302,415 | * | 7/1989 | Kovensky | 248/475.1 |
| 2,596,632 | * | 5/1952 | Whitehead | 403/79 X |
| 4,877,164 | * | 10/1989 | Baucom | 224/42.44 |
| 4,881,843 | * | 11/1989 | Randleman | 403/92 X |
| 4,912,349 | * | 3/1990 | Chang | 403/91 X |
| 5,086,958 | * | 2/1992 | Nagy | 224/42.42 |
| 5,109,411 | * | 4/1992 | O'Connell | 379/454 |
| 5,179,590 | * | 1/1993 | Wang | 379/454 |
| 5,392,350 | * | 2/1995 | Swanson | 379/454 X |
| 5,414,770 | * | 5/1995 | Wang | 379/446 |
| 5,661,942 | * | 9/1997 | Palmer | 403/96 X |
| 5,860,824 | * | 1/1999 | Fan | 439/265 |
| 5,921,625 | * | 7/1999 | Muser | 297/215.15 |
| 6,138,041 | * | 10/2000 | Yahia | 379/445 X |

FOREIGN PATENT DOCUMENTS

| 109329 | * | 2/2000 | (CH) | 403/96 X |
|---|---|---|---|---|

* cited by examiner

Primary Examiner—Lynne H. Browne
Assistant Examiner—Ernesto Garcia
(74) Attorney, Agent, or Firm—Raymond Y. Chan; David and Raymond Patent Group

(57) ABSTRACT

A toggle joint combination for extending a receptacle of automobile cigarette lighter and application thereof, wherein an insertion portion of this invention is plugged in the receptacle of automobile cigarette lighter; every extension portion may be extended by coupling with additional extension portions; the rear end of the last toggle is used to connect with various articles, such as a beverage rack, electric fan, illuminating ashtray, electric extension connector, map light, hold-free mobile phone set, etc, which can be adjusted at will. This invention comprises at least an insertion portion, a first extension portion, and a second extension portion, and, more than two extension portions can be combined if desired.

2 Claims, 4 Drawing Sheets

TOGGLE JOINT COMBINATION FOR EXTENDING A RECEPTACLE OF AUTOMOBILE CIGARETTE LIGHTER AND APPLICATION THEREOF

BACKGROUND OF THE INVENTION

1. Field of the Invention

This invention relates to an extending means, particularly to a toggle joint combination for extending a receptacle of automobile cigarette lighter that is used to extend things for easy reach in a limited automobile space.

2. Description of the Prior Art

As the space in an automobile is limited, deliberation would be required for fully application of the same. For example, diverse application of the receptacle of automobile cigarette lighter may have to tackle with structural problems, such as block of gearshift, etc.

The receptacle of cigarette lighter has been used as a DC power supply for some electrical appliance, such as handset holding-free means of mobile phone set. However, a user has to risk a traffic accident when he is taking out his mobile phone set from pocket and talking on the one hand and driving on the other.

It comes therefore a means later on that can bear a mobile phone set or a can of beverage, and nevertheless, the LCD (liquid crystal display) panel looks rather vague owing to improper visual angle, so that the driver has to concede and turn his body to approach the phone set to still risk a traffic danger.

In view of the above-described imperfections, after years of constant effort in research, the inventor of this invention has consequently developed and proposed this improved mechanism pertaining to the subject matter.

SUMMARY OF THE INVENTION

This invention is proposed to provide a toggle joint combination for extending a receptacle of automobile cigarette lighter and application thereof, wherein the amount of extension portion may be increased if necessary, and the toggle joint combination can be orientally adjusted at will to dodge obstacles in limited car space. Another object of this invention is to provide a toggle joint combination for extending a receptacle of automobile cigarette lighter and application thereof, wherein the second extension portion may cooperate with consuming articles for diversified usage to lower down production cost.

A further object of this invention is to provide a toggle joint combination for extending a receptacle of automobile cigarette lighter and application thereof, wherein a ring type flange gear is used to connect an extension portion with another, and the toggle joint can rotate easily by virtue of slide of each node The engagement tightness of the toggle joints may be adjusted with a locking bolt, and rotation can be stopped by fixing the flange gear in pits.

With abovesaid merits, the toggle joint combination for extending a receptacle of automobile cigarette lighter comprises an insertion portion, a first extension portion, and a second extension portion. Each pair of extension portions is combined with a toggle joint in different orientation, wherein the front end of the insertion portion is plugged in the receptacle of the automobile cigarette lighter, the rear end is coupled with one end of the first extension portion, and the other end of the first extension portion is coupled to one end of the second extension portion, and so forth till the last extension portion whose other end is cooperated with a consuming article. Each joint is made by engagement of a flange gear that can be adjusted orientally at will can rotate easily and smoothly in virtue of node slide, and rotation can be stopped by fixing the flange gear in pits.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
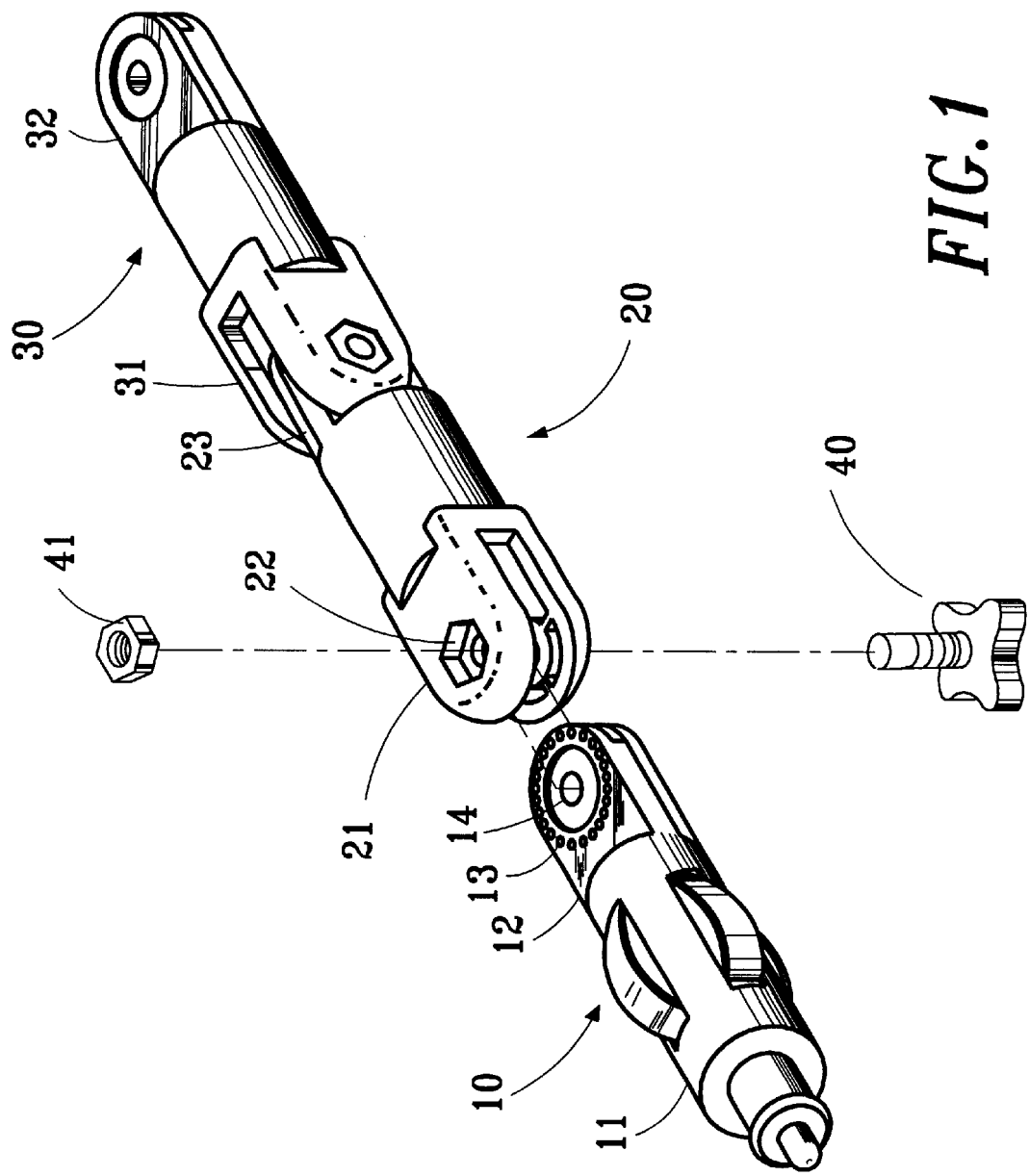
FIG. 1 is an elevational view showing combination of an insertion portion, a first extension portion, and a second extension portion of this invention.

As shown in FIG. 1, a toggle joint combination for extending a receptacle of automobile cigarette lighter of this invention mainly comprises an insertion joint portion 10, a first extension portion 20, and a second extension portion 30, which, the extension portions, can be coupled with each other by different oriented toggle joints. The insertion portion 10 further comprises a plug 11 at the front end to be inserted in a receptacle 50 of automobile cigarette lighter and a scarf joint shaft portion 12 located at a rear end toggle joint. A plurality of dots 13 formed in a circle and a central through hole 14 are disposed in upper surface of the scarf joint shaft portion 12. Another central through hole 22 is provided to a scarf joint portion 21 of the first extension portion 20. When the insertion portion 10 is used to combine with the first extension portion 20, a locking bolt 40 is taken to penetrate the central through holes 14, 22 and locked by a locking nut 41, so that the joint tightness may be adjusted. Moreover, a scarf joint shaft portion 23 at the other end of the extension portion 20 is to combine with a scarf joint portion 31 of the second extension portion 30, and a scarf joint shaft portion 32 at the other end of the second extension portion 30 is used to cooperate with various consuming articles. A ring type flange gear is employed in each joint for easy rotation by virtue of slide motion of each anode, which can be stopped easily by fixing the flange gear in the pits.

Figure 2:
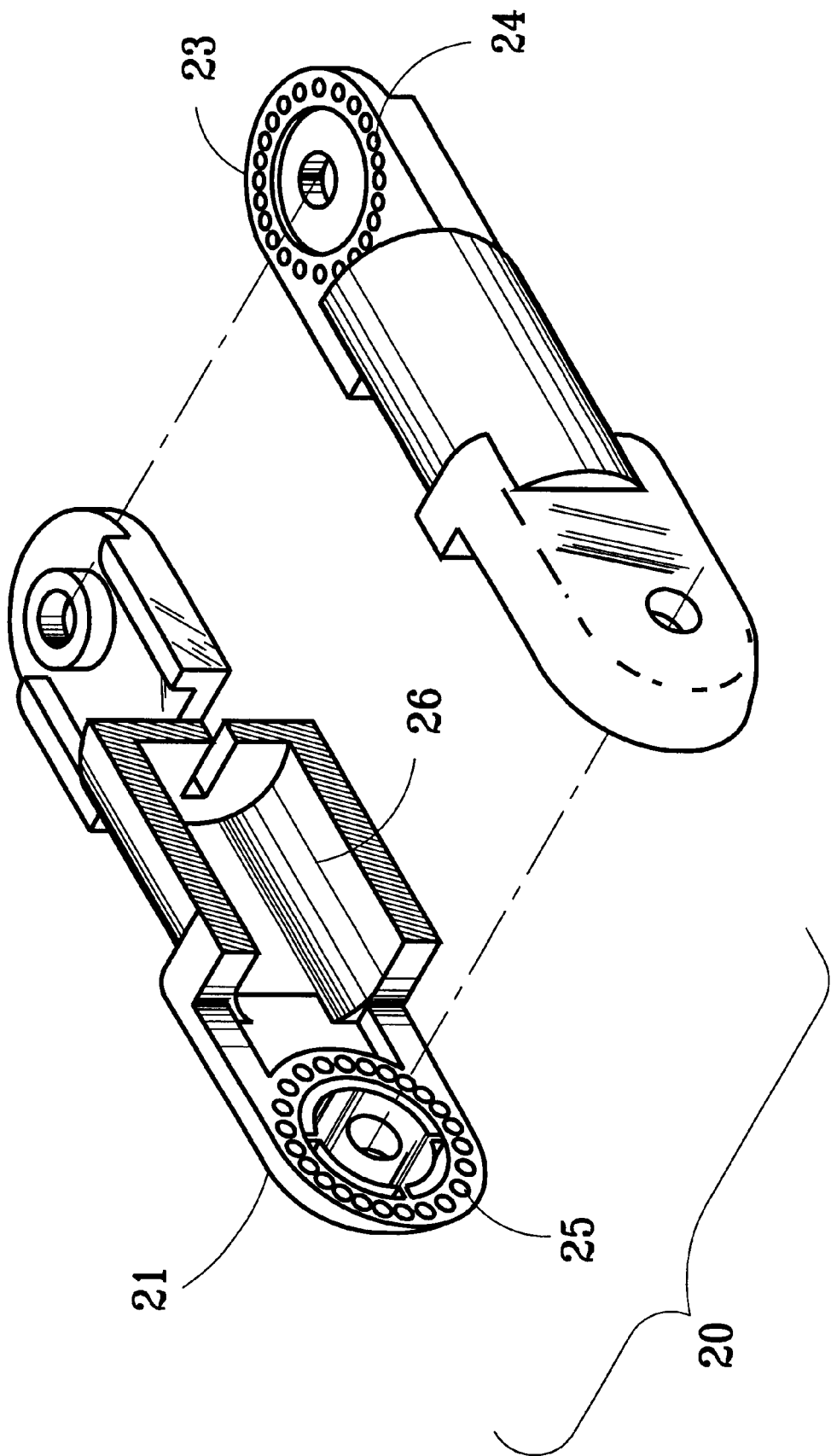
FIG. 2 is an enlarged view showing a toggle joint of this invention.

As each extension portion comprises both a scarf joint shaft portion and a scarf joint portion that only the first extension portion is taken as a representative illustrated in FIG. 2. The ring type flange gear of the scarf joint shaft portion 23 in the first extension portion 20 is composed of plural surrounding protruded dots 24. The formation of plural pits 25 disposed on inner face of the scarf joint portion 21 is arranged to accommodate a corresponding ring type flange gear of a scarf joint shaft portion in another extension portion, and thereby a combination of two extension portions can rotate smoothly with easy orientation and intimate engagement, and tightness of the toggle joint can be adjusted by the locking bolt. A hollow internal portion 26 in the extension portion facilitates an internal wiring work without blocking smooth rotation of this invention.

Figure 4:
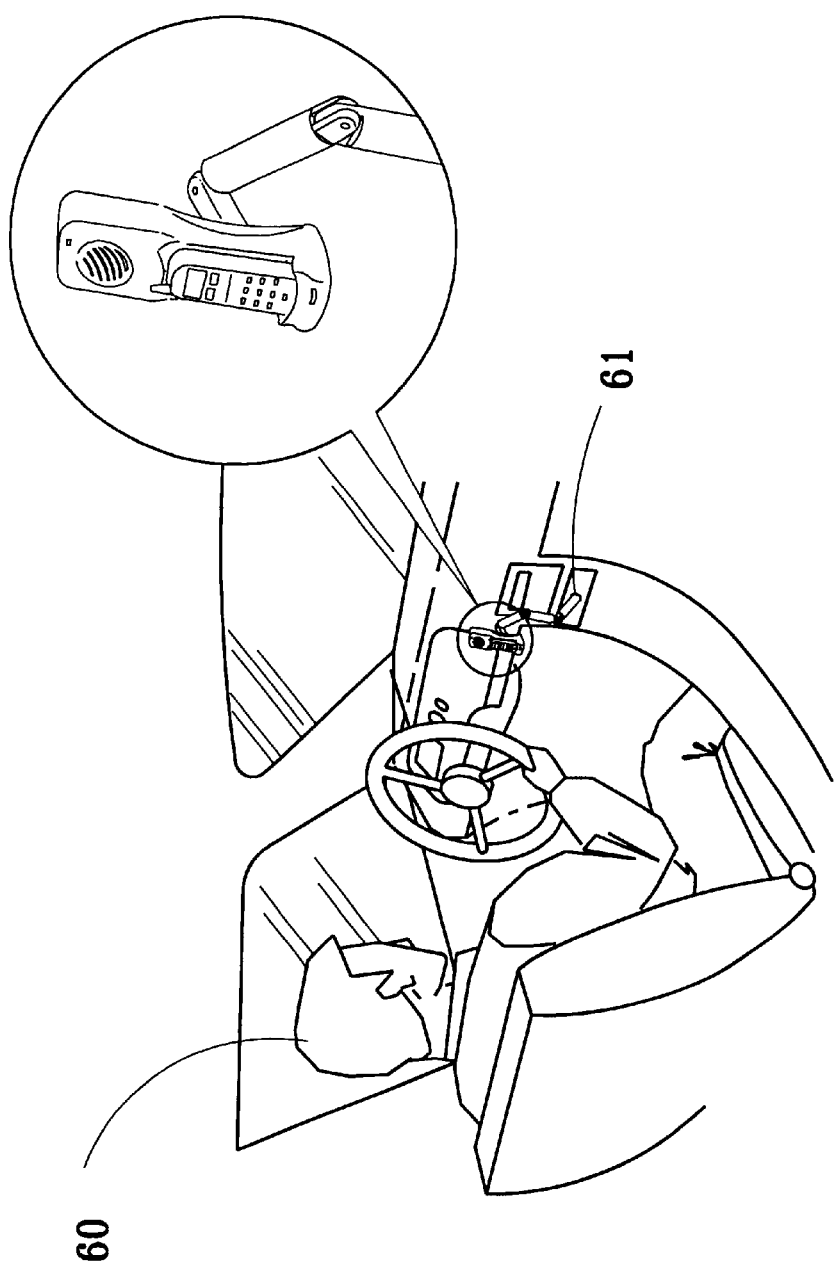
FIG. 4 is a schematic view showing combination of the second extension portion of this invention with a receptacle of a mobile phone set.

As shown in FIG. 4, this invention can fit any automobile despite of car specifications (position of steering seat may be different). A driver 60 must pay all his attention to peripheral situation when driving, so that this invention is plugged in a cigarette lighting hole 61 for length extension, which may be extended farther if necessary, to make it easier for the driver 60 to reach something fastened to this invention without turning his eyesight. In addition, characters shown on a LCD (liquid crystal display) panel of a mobile phone set usually cannot be viewed and read clearly due to an improper visual angle. This defect can be eliminated thoroughly by using toggle joint of the extension portions of this invention.

Figure 3:
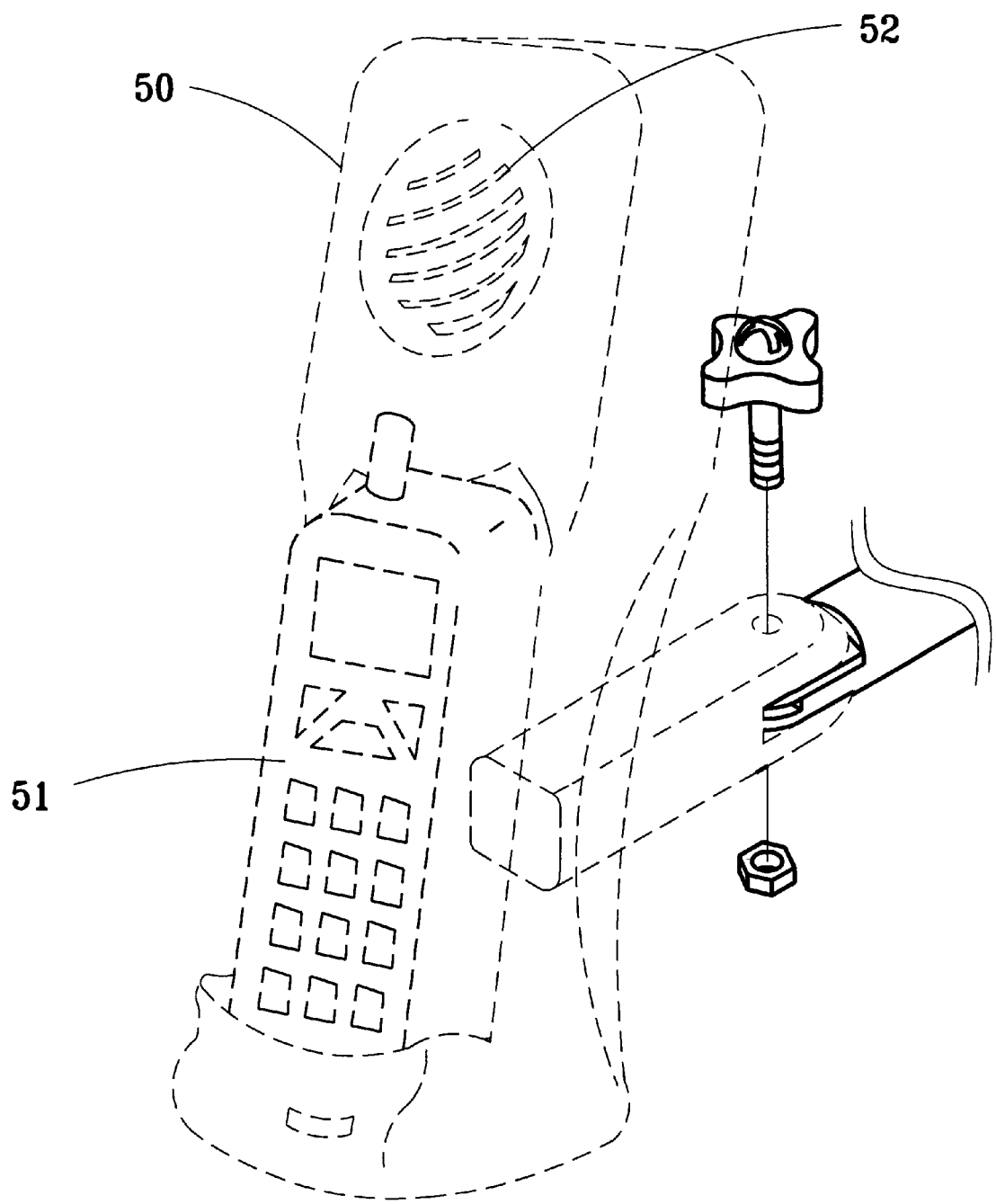
FIG. 3 is a schematic view of this invention in an automobile.

As shown in FIG. 3, a pivotally jointing portion at the toggle joint in the last extension portion may be used to hold articles in different orientations, and here a hold-free mobile phone is illustrated as an example. It requires only simple technique for revising the electronic circuit, so that a speaker 52 in a phone set receptacle 50 shall buzz when a phone call is coming for the mobile phone 51, and the driver can talk in a hold-free manner.

The main object of this invention is to enable the driver to move an article to somewhere within his visual range with orientation adjustable at will, and the bearable article may include a beverage rack, electric fan, illuminating ashtray, etc.

In comparison with prior skill, this invention is advantageous in:
1. Providing a convenient tool to enable a driver to reach things without moving his body or turning his eyesight to avoid accidents.
2. Changing coupled receptacle at will to lower down production cost and make it diversified.
3. Engagement of toggle joint adjustable.

Although, this invention has been described in terms of preferred embodiments, it is apparent that numerous variations and modifications may be made without departing from the true spirit and scope thereof, as set forth in the following claims.

What is claimed is:

1. A toggle joint extension arm in combination with a receptacle of an automobile cigarette lighter for a DC powered article, comprising:

an insertion joint portion having a front end provided with a plug for inserting in said receptacle of said automobile cigarette lighter and a rear end provided with a scarf joint shaft portion, wherein said scarf joint shaft portion is a rib body having two parallel surfaces, a central through hole penetrating therethrough, and a plurality of dots provided on one of said surfaces and evenly aligned spacedly around said central through hole;

a first extension portion having a first front end and a first rear end, wherein a first scarf joint portion is provided at said first front end and a first scarf joint shaft portion at said first rear end, wherein said first scarf joint portion is a U-shaped body defining a first gap pivotally connecting said scarf joint shaft portion of said insertion joint portion therein, said first scarf joint portion having a first joint central through hole and a plurality of pits provided on an inner face of said first scarf joint portion and evenly aligned spacedly around said first joint central through hole for engaging with said dots of said scarf joint shaft portion of said insertion joint portion respectively when said scarf joint shaft portion of said insertion joint portion is pivotally connected with said first scarf joint portion of said first extension portion, wherein said first scarf joint shaft portion is a rib body having two parallel surfaces and extending perpendicularly with said first gap of said first scarf joint portion, a first shaft central through hole penetrating through said first scarf joint shaft portion and a plurality of dots provided on one of said surfaces thereof and evenly aligned spacedly around said first shaft central through hole;

a first locking bolt which penetrates through said first joint central through hole of said first scarf joint portion and said central through hole of said scarf joint shaft portion and is locked by a first locking nut, so as to fasten said scarf joint shaft portion of said insertion joint portion with said first scarf joint portion of said first extension portion;

a second extension portion having a second front end and a second rear end, wherein a second scarf joint portion is provided at said second front end and a second scarf joint shaft portion at said second rear end, wherein said second scarf joint portion is a U-shaped body defining a second gap pivotally connecting said first scarf joint shaft portion of said first extension portion therein, said second scarf joint portion having a second joint central through hole and a plurality of pits provided on an inner face of said second scarf joint portion and evenly aligned spacedly around said second joint central through hole for engaging with said dots of said first scarf joint shaft portion of said first extension portion respectively when said first scarf joint shaft portion of said first extension portion is pivotally connected with said second scarf joint portion of said second extension portion, wherein said second scarf joint shaft portion is a rib body having two parallel surfaces and extending perpendicularly with said second gap of said second scarf joint portion, a second shaft central through hole penetrating through said second scarf joint shaft portion and a plurality of dots provided on one of said surfaces of said second scarf joint shaft portion and evenly aligned spacedly around said second shaft central through hole; and a second locking bolt which penetrates through said second joint central through hole of said second scarf joint portion and said first shaft central through hole of said first scarf joint shaft portion and is locked by a second locking nut so as to fasten said first scarf joint shaft portion of said first extension portion with said second scarf joint portion of said second extension portion;

wherein by unfastening said first locking nut with said first locking bolt, a first angle between said insertion joint portion and said first extension portion is able to be adjusted on a first orientation plane by pivoting said first extension portion with respect to said insertion joint portion and by unfastening said second locking nut with said second locking bolt, a second angle between said first extension portion is able to be adjusted on a second orientation plane, which is perpendicular to said first orientation plane, by pivoting said second extension portion with respect to said first extension portion;

wherein after adjustment, said first angle between said insertion joint portion and said first extension portion is locked up by fastening said first locking nut with said first locking bolt and engaging said pits of said first scarf joint portion of said first extension portion with said dots of said scarf joint shaft portion of said insertion joint portion respectively, and said second angle between said first extension portion and said second extension portion is locked up by fastening said second locking nut with said second locking bolt and engaging said pits of said second scarf joint portion of said second extension portion with said dots of said first scarf joint shaft portion of said first extension portion respectively;

thereby said toggle joint extension arm enables said DC powered article connected thereto to be adjusted in both horizontal and vertical directions.

2. The toggle joint extension arm, as recited in claim 1, wherein said second scarf joint shaft portion is adapted for fastening said DC powered article, and each of said first extension portion and said second extension portion has a hollow internal portion for extending electrical wires between said DC powered article and said insertion joint.

\* \* \* \* \*